(12) United States Patent
Chang et al.

(10) Patent No.: US 10,769,738 B2
(45) Date of Patent: Sep. 8, 2020

(54) INTERACTIVE TUTORIAL INTEGRATION

(71) Applicant: Adobe Inc., San Jose, CA (US)

(72) Inventors: Walter W. Chang, San Jose, CA (US); Zhihong Ding, Davis, CA (US); Lubomira A. Dontcheva, Seattle, WA (US); Gregg D. Wilensky, San Francisco, CA (US); Darshan D. Prasad, San Jose, CA (US); Claudia Veronica Roberts, Princeton, NJ (US)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 15/925,259

(22) Filed: Mar. 19, 2018

(65) Prior Publication Data
US 2019/0287197 A1 Sep. 19, 2019

(51) Int. Cl.
| | | |
|---|---|---|
| G06F 17/20 | (2006.01) | |
| G06Q 50/20 | (2012.01) | |
| G09B 5/02 | (2006.01) | |
| G06F 8/34 | (2018.01) | |
| G06F 9/451 | (2018.01) | |
| G09B 5/06 | (2006.01) | |
| G06F 8/30 | (2018.01) | |

(52) U.S. Cl.
CPC ............. *G06Q 50/205* (2013.01); *G06F 8/30* (2013.01); *G06F 8/34* (2013.01); *G06F 9/453* (2018.02); *G09B 5/02* (2013.01); *G09B 5/06* (2013.01)

(58) Field of Classification Search
CPC .......... G06Q 50/205; G06F 9/453; G06F 8/34
See application file for complete search history.

(56) References Cited

U.S. PATENT DOCUMENTS

| | | | | | |
|---|---|---|---|---|---|
| 5,442,759 | A | * | 8/1995 | Chiang | G06Q 50/205 434/118 |
| 5,493,658 | A | * | 2/1996 | Chiang | G09B 19/0053 715/709 |
| 5,535,422 | A | * | 7/1996 | Chiang | G06F 9/543 715/709 |
| 6,343,237 | B1 | * | 1/2002 | Rossow | E02F 9/26 700/83 |
| 7,415,714 | B2 | * | 8/2008 | Chapman | G09B 7/02 715/781 |
| 9,449,524 | B2 | * | 9/2016 | Bruce | G09B 7/00 |
| 9,649,556 | B1 | * | 5/2017 | Curtis | A63F 13/12 |
| 2002/0091993 | A1 | * | 7/2002 | Walley | G06F 9/453 717/120 |
| 2004/0086834 | A1 | * | 5/2004 | Harned | G09B 19/0053 434/118 |
| 2006/0259613 | A1 | * | 11/2006 | Othmer | H04L 67/22 709/224 |
| 2007/0015118 | A1 | * | 1/2007 | Nickell | G09B 5/02 434/118 |
| 2014/0310596 | A1 | * | 10/2014 | Lafreniere | G06F 3/0481 715/708 |

(Continued)

Primary Examiner — Shahid K Khan

(57) ABSTRACT

A tutorial for a given application may be leveraged to generate executable code that can then be executed within a native instruction service of the application. In this way, a software application may thus provide an integrated, interactive learning experience for a user, in a manner that extends beyond the instructional content included in the native instruction service, i.e., that includes at least a portion of the instructional content of the tutorial.

17 Claims, 11 Drawing Sheets

(56) References Cited

U.S. PATENT DOCUMENTS

| | | | |
|---|---|---|---|
| 2015/0121217 A1* | 4/2015 | O'Donoghue | G06F 3/0483 |
| | | | 715/708 |
| 2017/0010903 A1* | 1/2017 | Kidron | G06F 3/0482 |
| 2017/0011645 A1* | 1/2017 | Bruce | G09B 7/00 |
| 2018/0189077 A1* | 7/2018 | Gupta | G06F 9/453 |
| 2018/0336044 A1* | 11/2018 | Want | G06F 9/453 |
| 2019/0096280 A1* | 3/2019 | Saunders | G09B 19/00 |

* cited by examiner

INTERACTIVE TUTORIAL INTEGRATION

TECHNICAL FIELD

This description relates to tutorial integration for software applications.

BACKGROUND

The ability of software developers to develop software applications with complex and extensive features often exceeds an ability of a user to have knowledge of, and expertise in utilizing, such features. As a result, users may be aware that desired results are possible, but may be unable to generate the desired results. In other scenarios, users may not even be aware that desired results are obtainable.

Software developers typically attempt to mitigate such difficulties, e.g., by providing instructions for using the software applications being developed. In some cases, the instructions may be provided within a context of a relevant software application, such as by providing interactive instructions that appear within, and are generated by, the software application itself. Providing such instructions, however, is often difficult and time-consuming. Moreover, software applications may have uses that are developed over time by various users, which were not explicitly envisioned by the original software developers.

For these and other reasons, it is common for software applications, particulrly complex software applications, to be provided with tutorials that provide explanations and instructions for the software applications. For example, a third party may independently create a tutorial for a software application, and provide the tutorial to users of the software application to assist the users in utilizing the software application.

Such tutorials may take the form of static web pages, or instructional videos. Although the content of such tutorials may be highly useful and instructive, the form and structure of such tutorials may vary widely. Moreover, such tutorials are typically outside of a context of the relevant software application, requiring context switching between the tutorial and the application, and other associated inconveniences.

SUMMARY

According to one general aspect a computer program product is tangibly embodied on a non-transitory computer-readable storage medium and includes instructions. The instructions, when executed by at least one computing device, are configured to cause the at least one computing device to parse a tutorial file derived from a web page, the tutorial file representing a tutorial provided by the web page for a software application, and constructed in a hierarchical format in which tutorial attributes are specified with respect to corresponding values of the tutorial attributes, the values including at least one instruction included in the web page for using the software application. The instructions, when executed, are further configured to execute a mapping of the tutorial attributes to application features of the software application, and generate instructional code that is executable by a native instruction service of the software application to generate at least one instruction element within the software application, based on the mapping, the at least one instruction element identifying at least one application feature of the application features that is configured to enable completion of the at least one instruction.

According to another general aspect, a computer-implemented method includes parsing a tutorial file derived from a web page, the tutorial file representing a tutorial provided by the web page for a software application, and constructed in a hierarchical format in which tutorial attributes are specified with respect to corresponding values of the tutorial attributes, the values including at least one instruction included in the web page for using the software application. The computer-implemented method may further include executing a mapping of the tutorial attributes to application features of the software application, and generating instructional code that is executable by a native instruction service of the software application to generate at least one instruction element within the software application, based on the mapping, the at least one instruction element identifying at least one application feature of the application features that is configured to enable completion of the at least one instruction.

According to another general aspect, a system includes at least one memory including instructions, and at least one processor that is operably coupled to the at least one memory and that is arranged and configured to execute instructions that, when executed, cause the at least one processor to input a tutorial file including ordered instructions for performing an application function of a software application, and map the ordered instructions to corresponding application features of the software application. The at least one processor may be arranged and configured to execute the instructions, that, when executed, generate instruction code executable by a native instruction service of the software application and configured to enable an interactive execution of the corresponding application features within the application to implement the ordered instructions and execute the application function.

The details of one or more implementations are set forth in the accompanying drawings and the description below. Other features will be apparent from the description and drawings, and from the claims.

DETAILED DESCRIPTION

Figure 1:
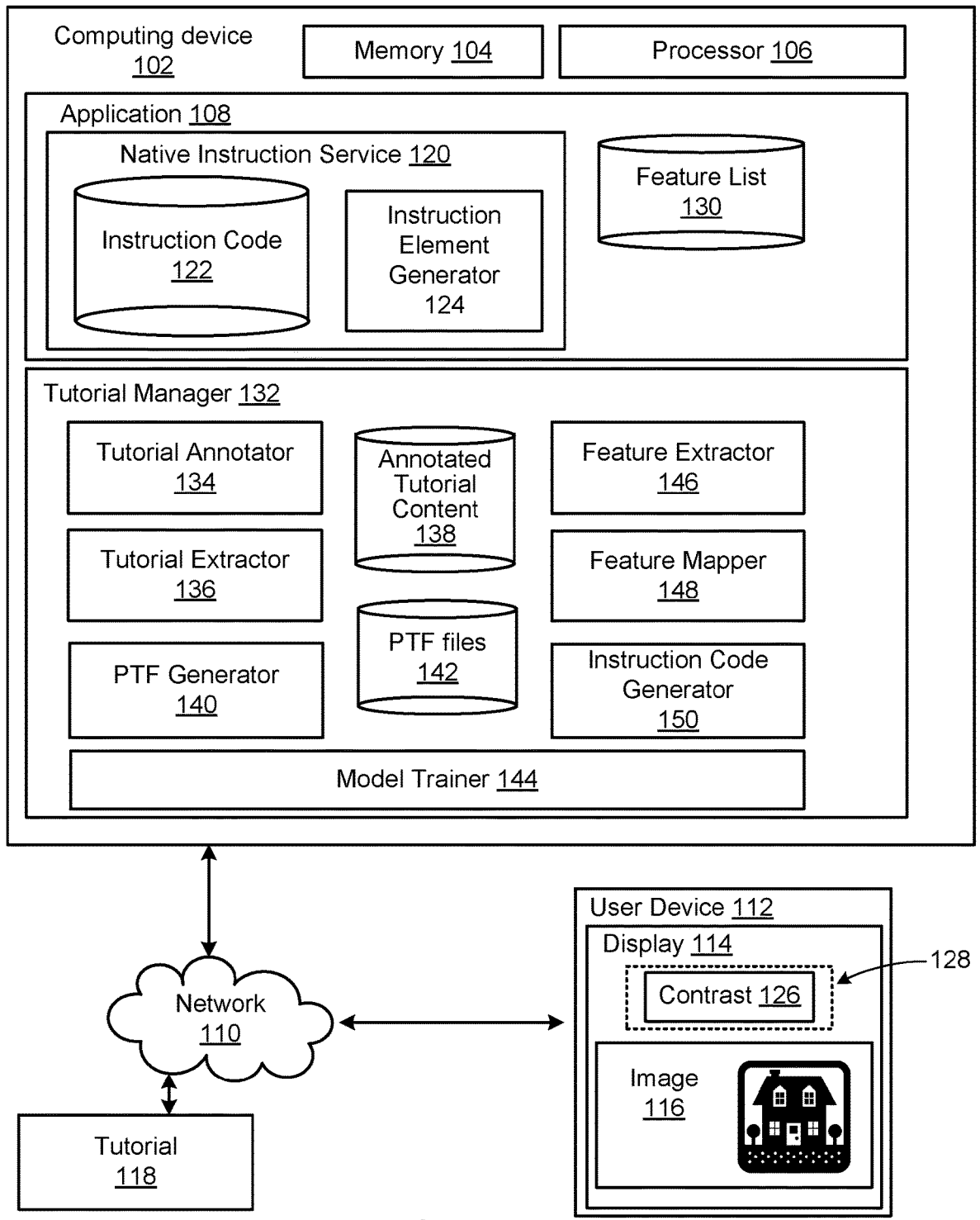
FIG. 1 is a block diagram of a system for internal and interactive tutorial integration.

This document describes systems and techniques that provide for interactive tutorial integration for software applications having native instruction services. Such systems and techniques overcome existing challenges of previous systems and techniques, and create or improve the process(es) to perform related automated processing. For example, software applications may include native instruction services designed to assist users in learning how to utilize native application features, including providing users with interactive access to instructional content and associated application features. Meanwhile, web-based or other tutorial content may also be designed to provide additional or alternative instructional content for the software application.

As described herein, a tutorial for a given software application may be leveraged to generate executable code that can then be executed within a native instruction service of the software application. In this way, the software application may thus provide an integrated, interactive learning experience for a user, in a manner that extends beyond the instructional content included in the native instruction service, i.e., that includes at least a portion of the instructional content of the tutorial.

The described code generation techniques utilize an efficient, fast, accurate and/or complete algorithm(s) to provide for new computer functionalities. For example, the algorithms may extract tutorial content for a software application from third-party tutorial websites, including generating structured, annotated, and classified tutorial content that is included within a generic or universal tutorial format, referred to herein as the portable tutorial format (PTF). The algorithms may further process such PTF files to generate executable code that may then be included for execution within a native instruction service of the software application, to provide the type of integrated, interactive instruction that is referenced above and described in detail, below.

For example, the systems and techniques provide a user interface(s) within a software application to enable users to learn about application features of a given software application, from within a context of the software application itself. For example, the tutorial may instruct a user to use a particular menu, tool, or icon of the software application in order to obtain a desired outcome. It is often very difficult for a user to locate a particular menu, tool, or icon from within an entire user interface of a software application, even when the user is provided with a name or general layout location. Using the described techniques, however, the desired menu, tool, or icon may be highlighted or otherwise identified within the application itself, by using the native instruction service to execute the generated code obtained from the tutorial.

In addition to the type of application integration just referenced, the described techniques may provide an interactive learning experience for a user, within the software application. For example, an original tutorial may instruct a user to proceed through a plurality of steps to obtain a desired outcome. Using the described techniques, the native instruction service may provide a first instruction to the user in conjunction with a first application feature, receive a corresponding input from the user, and then interactively (e.g., based on the received input) provide a second instruction to the user, in conjunction with a second application feature.

To provide a non-limiting, specific example for the sake of illustration, the software application may be an editing application for editing image or video files, and may include a native instruction service designed to provide interactive instructions to users to obtain desired editing results. For example, the native instruction service may provide instructions for adding or removing an image element, or changing a brightness or color of an image. Meanwhile, a plurality of tutorials may be provided with respect to the image/video editing application. For example, a tutorial may provide instruction for performing a type of specialized image editing that is within a capability of the editing application, but not specifically included within instructional content of the native instruction service. As a non-limiting example, such specialized image editing may occur within a specific setting, such as images taken with very high levels of magnification.

The described algorithms may thus be understood to transform content of the specialized tutorial into the type of PTF file referenced above, and then generate, from the PTF file, executable code that may be provided for execution to the native instruction service of the editing application. In this way, a user may be provided with integrated, interactive, step-by-step instructions for performing the type of image editing desired, from within a context of the editing application itself.

As described in detail below, example techniques include the use of various types of machine learning and associated algorithms and models. For example, such algorithms and models may be used to extract tutorial content from tutorial websites, in an efficient, automated manner, including annotating the extracted content in a manner specific to tutorial content. Such algorithms and models may further be used to convert the extracted, annotated content into a PTF file, including classifying the annotated content as one of a known set of tutorial structures. Such algorithms and models may further be used to determine application features supported by the native instruction service. Such algorithms and models may further be used to determine content of the PTF file that corresponds to the determined application features supported by the native instruction service. In a final example(s), such algorithms and models may be used to generate executable code for the native instruction service, to provide the type of integrated, interactive instruction experience for the tutorial content described herein.

Additionally, the systems and techniques described herein advantageously improve existing technology areas. For example, as described, computer-based instruction is improved, e.g., by providing for computer-based instruction for utilizing application features. Further, the systems and techniques may be used for a more automated and more efficient and faster approach to generating executable code for native instruction services.

FIG. 1 is a block diagram of a system 100 for interactive tutorial integration. The system 100 includes a computing device 102 having at least one memory 104, at least one processor 106 and at least one application 108. The computing device 102 may communicate with one or more other computing devices over a network 110. For instance, the computing device 102 may communicate with a user device 112 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network. In many of the following examples, the computing device 102 is described as, or may be understood to represent, a server.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device (e.g., the user device 112) over a network, such as the network 110. In one implementation, the application 108 may be an image editing application, as referenced above and described in detailed examples, below. In other implementations, the application 108 may be a document creation or viewer application, a search application, a spreadsheet application, a music or audio application, or virtually any other type of software application that may benefit from the types of interactive tutorial integration described herein. The application 108 also may be a standalone application, or an application that runs, at least partially, in another application, such as a browser application. Of course, the application 108 may be a combination of any of the above examples, as well.

In the example of FIG. 1, the user device 112 is illustrated as including a display 114 in which an image 116 is rendered. As referenced above, the image 116 may be provided by an image editing application, which may include at least a portion of the application 108, or which may leverage an ability of the application 108 to benefit from the various tutorial integration techniques described herein.

Specifically, the image 116 is simply an image of a house included simply for an illustration of some of the relevant concepts described herein with respect to the system 100 of FIG. 1. A more detailed example illustration of the application 108 as an image editing application being used to edit an image is provided below, with respect to FIG. 2.

Further in FIG. 1, a tutorial 118 represents a simplified example of a web page that includes instructional material for using the application 108, e.g., to edit the image 116. In this regard, the term "tutorial" should be understood to represent virtually any such organized, instructional material that may be available over the network 110, or otherwise made available. In practice, the tutorial 118 is often provided by a $3^{rd}$ party provider, e.g., someone other than a provider of the software application 108 and the user of the user device 112.

For example, the tutorial 118 may be provided by another user, who wishes to share a useful image editing technique. In other examples, the tutorial 118 may be provided as part of a suite of tutorials for the application 108, and other applications, as well, such as when professional tutorial authors collectively create and provide such tutorials. In such cases, tutorials such as the tutorial 118 may be found as part of such an organized collection of tutorials, e.g., indexed by topic. In other scenarios, individual tutorials may be found directly, e.g., as a result of a search performed by a user of the user device 112. Other examples of the tutorial 118 are provided below, or would be apparent.

Meanwhile, the application 108 is illustrated as including a native instruction service 120, which executes instruction code to provide useful instructions to the user of the user device 112 in using the application 108. For example, an instruction element generator 124 is illustrated as providing an instruction with respect to a specific application feature of the application 108. That is, in the simplified example of FIG. 1, the display 114 is illustrated as including a selection button 126 for selecting a contrast of the image 116. In operation, the instruction element generator 124 may be configured to provide an instruction with respect to the contrast button 126, e.g., by highlighting or otherwise identifying the contrast button 126, such as through the use of an instructional element illustrated as a dashed outline 128 in FIG. 1. For example, although not explicitly illustrated in FIG. 1, the native instruction service 120 may provide an instruction such as, "Next, select the contrast button," followed by generating the instruction element 128 to facilitate the user's selection of the contrast button 126.

Thus, it will be appreciated that the tutorial 118 and the native instruction service 120 both provide various advantages and challenges. For example, the tutorial provides advantages of, e.g., providing highly-customized instructional material for a user of the application 108. That is, the tutorial 118 may be customized for the specific user, or class of user (e.g., a novice, intermediate, or advanced user), and/or may be customized based on the type of instruction being given (e.g., image editing for highspeed photography, or other specific context). Further, the tutorial 118 may be generated and published after a time that the application 108 itself is provided, so that the tutorial 118 includes material that may not have been relevant or available at a time of release of the application 108. Still further, the tutorial 118 may leverage a wide range of author (s) who may have a high degree of skill in their respective areas of expertise, and who may provide instructional material for capabilities of the application 108 that may not even be known or appreciated by a provider of the software application 108.

On the other hand, one challenge of the tutorial 118 is that the tutorial 118 typically provided in a separate context from the operation of the application 108. For example, if the tutorial 118 is provided as part of a website, then the tutorial 118 may be provided in a separate browser or browser window from the display 114 of the application 108. In these and similar cases, the user of the user device 112 may be required to switch from the context of the tutorial 118 to the context of the application 108, which may be inconvenient and time-consuming.

Further, it may be difficult for the user to identify and locate the tutorial 118. Also, the user may experience website delays, peripheral undesired content, and various other inconveniences when accessing the tutorial 118.

As a final example of a difficulty of using the tutorial 118 directly, it may be difficult for the tutorial 118 to identify required aspects of the application 108. For example, if the tutorial 118 attempts to provide an instruction with respect to the contrast button 126, the tutorial 118 may have to first provide instructions regarding how to locate the contrast button 126 in the first place (e.g., by identifying a general layout location, or a parent menu). Given the separate context of the tutorial 118, such instructions are often difficult to provide in a concise and reliable manner, may exacerbate the types of contextswitching referenced above, and may generally lead to confusion and frustration of the user.

Meanwhile, the native instruction service 120 has the advantages of being included within the application 108 itself. For example, designers and developers of the application 108 may also provide the native instruction service 120, e.g., in conjunction with a release or update of the application 108. As a result, as already described, the instruction element 128 may be provided directly within a context of the application 108.

Generally speaking, such designers/developers of the application 108 will access to, and knowledge of, relevant features of a feature list 130 of the application 108. In this regard, and as referenced and explained in more detail, below, such features generally refer to any relevant capabilities of the application 108 for which instruction may be provided, including any tools, actions, or commands that are included, as well as any associated menus, buttons, toolbars, icons, or other visual (or audio, or haptic) elements used to select or implement the tools, actions, or commands. Of course, an example of such a feature is the feature of adjusting an image contrast, implemented by the contrast button 126.

In order to solve the challenges referenced above, and other challenges, and to leverage the various advantages of both the tutorial 118 and the native instruction service 120, a tutorial manager 132 is configured to, e.g., locate the tutorial 118, and integrate content of the tutorial 118, including generating instruction code to be included within the instruction code 122. For example, if the tutorial 118 includes an instruction for using the contrast button 126, the tutorial manager 132 may generate instruction code that is included within the instruction code 122 and executable by the instruction element generator 124. Consequently, the instruction element generator 124 may generate the instruction element 128 directly within a context of the display 114 and the application 108, thereby leveraging the instructional content of the tutorial 118 and also utilizing the convenience of the native instruction service 120.

In the remainder of the description of FIG. 1, elements 134-150 of the tutorial manager 132 are individually described as separate modules or components having specific functions. It will be appreciated that such description is intended to provide non-limiting examples of such functions for the sake of explanation, but that other implementations are possible, as well. For example, any single element of the tutorial manager 132 may be implemented as two or more sub-elements, or, conversely, any two or more elements may be integrated and implemented as a single element, as may be appropriate. Specific examples of implementations of FIG. 1 are provided below, with respect to remaining FIGS. 2-13, or would be apparent.

In the example of FIG. 1, the tutorial manager 132 includes a tutorial annotator 134. The tutorial annotator 134 may be configured to parse the tutorial 118 and annotate content of the tutorial 118. For example, the tutorial annotator 134 may add meta-data, tags, labels, or other annotations that define a semantic meaning, or other context or characteristic, of one or more terms of the content of the tutorial 118. By way of specific, non-limiting example, annotations may be added to identify a title or author of the tutorial 118, or a content description, or a subject heading.

A tutorial extractor 136 may be configured to extract a structure, or structural elements, of the tutorial 118. That is, as described in detail, below, tutorials such as the tutorial 118 tend to include a version of one or more tutorial structures. The tutorial extractor 136 may include one or more templates that may be applied to the tutorial 118, e.g., applied to the output of the tutorial annotator 134, to identify (e.g., further annotate) such structural elements or aspects. The resulting, annotated tutorial content 138 may be stored for further processing.

Specifically, a portable tutorial format (PTF) generator 140 may be configured to parse the semantic and structural annotations of the annotated tutorial content 138 and generate a file having a standardized, consistent format that is applicable to (e.g., may be used to accurately and completely represent) virtually all tutorials, and that, as described below, may easily be converted for use by the native instruction service 120. The resulting file in PTF format may then be stored within PTF files 142.

In general, and as illustrated and described in detail below with respect to FIG. 10, a PTF file has a hierarchical format in which an identified structure(s) of the underlying tutorial is classified as one of a finite set of structure models, as illustrated and described below with respect to FIGS. 5-9. Further, information included within the resulting PTF file may be included and stored as attribute/value pairs (e.g., "author: Rebecca Creger"), to facilitate further processing.

In the example of FIG. 1, a model trainer 144 should be understood to be configured to train a plurality of models and associated algorithms that may be used by, e.g., the tutorial annotator 134, the tutorial extractor 136, and the PTF generator 140. In this regard, it will be appreciated that, in machine learning or artificial intelligence, one or more functions or algorithms are typically defined that relate an input, or type of input, to a corresponding output, or type of output. Such algorithms/functions are trained using training data which is accepted as representing a "ground truth" of known, accurate relationships between the inputs/outputs being considered.

In this context, the term training generally refers to executing a series of iterative rounds of training, in which optimal weight values for one or more of the referenced algorithms/functions are determined. In determining the optimal weights, the model trainer 144 essentially makes predictions based on the training data, and then measures the error in the predictions, using the ground truth available within the relevant training dataset. The function used to measure such error levels is often referred to as a loss function, which is generally designed to sum over the relevant training examples, and add to the calculated loss if a prediction was incorrect, or reduce/minimize the calculated loss if the prediction was correct. In this way, models may be conceptually understood to be trained to learn from mistakes made during the various iterations of predictions, so that the resulting, trained models, as referenced, will be fast, efficient, and accurate when deployed in the context of the tutorial manager 132.

More detailed examples of operations of the model trainer 144 are provided below, e.g., with respect to FIGS. 4 and 11-13. In general, it will be appreciated that each of the tutorial annotator 134, the tutorial extractor 136, and the PFT generator 140 may be implemented, at least in part, using corresponding machine learning algorithms trained using the model trainer 144. Of course, the model trainer 144 may be understood to represent two or more model trainers, each configured appropriately for a corresponding model being trained.

For example, for the elements 134, 136, 140, the model trainer 144 may use one or more known tutorial websites, for which tutorial semantics and structures have been determined for inclusion within corresponding datasets, and for which correct PTF files have been generated. These datasets may then be used as training data to train the tutorial annotator 134 to annotate a new tutorial, the tutorial extractor 136 to extract content of a new tutorial, and the PTF generator 140 to generate a corresponding PTF file for inclusion within the PTF files 142.

Further in FIG. 1, a feature extractor 146 may be configured to identify any and all application features of the software application 108 that may be relevant to one or more of the PTF files 142. For example, as referenced above, the application 108 may include the feature list 130, and the feature extractor 146 may determine at least some relevant features from the available feature list 130. However, when the feature list 130 is unavailable, or incomplete for purposes of the tutorial manager 132, the feature extractor 146 may be configured to execute a machine learning algorithm (trained by the model trainer 144) to analyze the application 108 and determine potentially relevant application features. For example, the feature extractor 146 may determine application tool names, commands, menus, and other actionable elements of the application 108.

The resulting features may then be used by a feature mapper 148 with respect to a particular PTF file of the PTF files 142. For example, as described in detail below, the feature mapper 148 may be configured to analyze a PTF file and determine references to included menu commands, or tool names, or other application features of the application 108. In particular, it will be appreciated that such references may not use a proper or complete name of corresponding application features.

Consequently, it will be appreciated that the feature mapper 148 may be trained by the model trainer 144 to execute natural language processing (NLP) of the content of the PTF file, to identify referenced application features correctly. In this regard, NLP should be understood to represent or include any suitable form of machine learning for analyzing the language of the PTF file. For example, NLP may be implemented as a rules-based approach, in which specific words and phrases are identified within text, and specific mappings to application features are designated when those words/phrases are identified. In other examples, large training datasets may be used to build a hierarchy of abstraction levels, in which each level is obtained using knowledge from an earlier level. Specifically, for example, a plurality of algorithms may be used to create a statistical model(s) characterizing data of the training dataset, including performing iterations with the statistical model(s) until they reach an acceptable level of accuracy (e.g., sufficiently minimized error or loss function).

Finally in FIG. 1, an instruction code generator 150 is configured to receive the mapped features of the feature mapper 148 with respect to a given PTF file, and generate executable code to be included within the instruction code 122 and executed by the native instruction service 120 (e.g., by the instruction element generator 124). For example, as described in detail below, the PTF file may be converted into a Javascript Object Notation (JSON) object, which may have a hierarchical structure similar to the PTF file, but expressed in terms of the relevant application features required to execute instructions of the original tutorial 118.

Although the example of JSON object is given, in which a subset of the JavaScript programming language is used, it will be appreciate that other data interchange language formats may be used to generate the instruction code. The choice of language may depend in part on the language of the instruction code 122 that may exist in various software applications. For example, an eXtensible Markup Format (XML) file may be used.

In this way, the native instruction service 120 may be modified to provide instructions to a user of the user device 112, within a context of the software application 108. For example, a developer or designer of the software application may utilize the tutorial manager 132 to update the application 108. In other examples, an administrator overseeing use of the application 108 by a plurality of users may be authorized to use the tutorial manager 132 to update the software application 108. In still other examples, the user of the user device 112 may be provided with an ability to identify the tutorial 118 and utilize the tutorial manager 132 to integrate the content of the tutorial 118 within the software application 108 for the type of interactive, contextual instructional experience described herein.

As just referenced, the tutorial 118 may be identified individually and processed by the tutorial manager 132, in order to include the particular subject matter of the tutorial 118. In other implementations, a plurality of tutorials may be identified, and integrated together. For example, a particular tutorial website may have a number of tutorials related to the software application 108, and that all use a similar set of semantics and structure. In such cases, the group of tutorials may be integrated together for future use, even though there may not be an immediate need for a given one of the tutorials.

Figure 2:
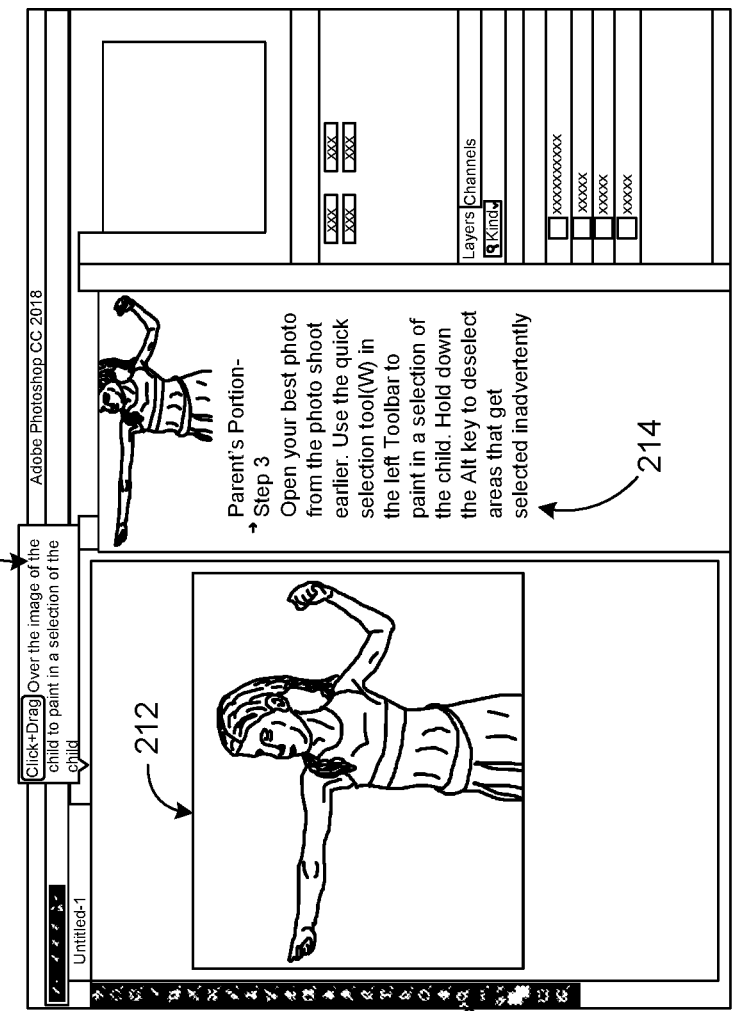
FIG. 2 illustrates screenshots of an example implementation of the system of FIG. 1.

FIG. 2 illustrates screenshots of an example implementation of the system 100 of FIG. 1. In the example of FIG. 2, a tutorial webpage 202 is illustrated, and represents, e.g., the tutorial 118 of FIG. 1. In the example of FIG. 2, the tutorial webpage 202 includes a plurality of steps of one or more procedures described by the tutorial, including a step 204 illustrated in FIG. 2 as "step 3." As referenced above with respect to FIG. 1, the tutorial webpage 202 also may include a plurality of advertisements and other ancillary content, represented in FIG. 2 by an example advertisement 206. Further, the tutorial content may include an image, video, audio, or other type of file that may be an example of the subject matter of the tutorial in question, represented by an image file 208.

In the example of FIG. 2, and in many of the examples that follow herein, the software application 108 of FIG. 1 is considered to be the Adobe Photoshop editing software. In such example implementations, the native instruction service 120 of FIG. 1 may be understood to be represented by the Photoshop Learn Panel program native to Adobe Photoshop. Consequently, as illustrated in the example of FIG. 2, and as described in detail herein, arrow 210 illustrates and represents the use of the tutorial manager 132 of FIG. 1 in analyzing the tutorial webpage 202 and generating code that is executable within the relevant native instruction service (Adobe Photoshop Learn Panel) of the Adobe Photoshop software application.

Specifically, the tutorial annotator 134 and the tutorial extractor 136 may be configured to annotate and extract content and structure of the tutorial webpage 202, and thereby generate a PTF file for inclusion within the PTF files 142, as a result of operations of the PTF generator 140. Then, using features obtained by, or through, the feature extractor 146, the feature mapper 148 may be configured to map the resulting PTF file to corresponding features of the Photoshop Learn Panel service. The instruction code generator 150 may then proceed to generate instruction code for the Photoshop Learn Panel that may be included within the instruction code 122.

As a result, the image 208 of the tutorial webpage 202 may be included and rendered as corresponding image 212, and the step 204 may similarly be included and rendered as step 214. As would be appreciated from FIG. 2, the image 212 and the step 214 are rendered directly within the Adobe Photoshop Learn Panel native instruction service, so that a user is not required to switch between a context of the Adobe Photoshop software application and the context of the tutorial webpage 202, in order to utilize the tutorial content of the webpage 202.

Thus, for example, the user will be able to utilize and benefit from the tutorial content, including, for example, utilizing native control functions and other application features when advancing through the tutorial content. For example, the user may use a "next step" selection button of the Adobe Photoshop Learn Panel in order to advance from the step 204/214 to a subsequent step of the procedure of the tutorial.

Further in the example of FIG. 2, the Adobe Photoshop Learn Panel may be understood to include a functionality known as "coach marks," in which overlays, highlights, or other visual or audio elements are rendered in a manner designed to provide highly contextual support to the user of the Photoshop Learn Panel. For example, visual indicators may be rendered next to a control required to implement a particular instruction, so that users may quickly and easily identify the required control. In the example of FIG. 2, an overlay 216 represents an example of such a coach mark, and provides specific instruction with respect to an operation to be performed using the image 212. It will be appreciated that, using the system 100 of FIG. 1, the coach mark 216 may be generated within the context of the Adobe Photoshop Learn Panel, as a result of corresponding, underlying executable code for the coach mark functionality having been generated by the instruction code generator 150 of the tutorial manager 132.

Figure 3:
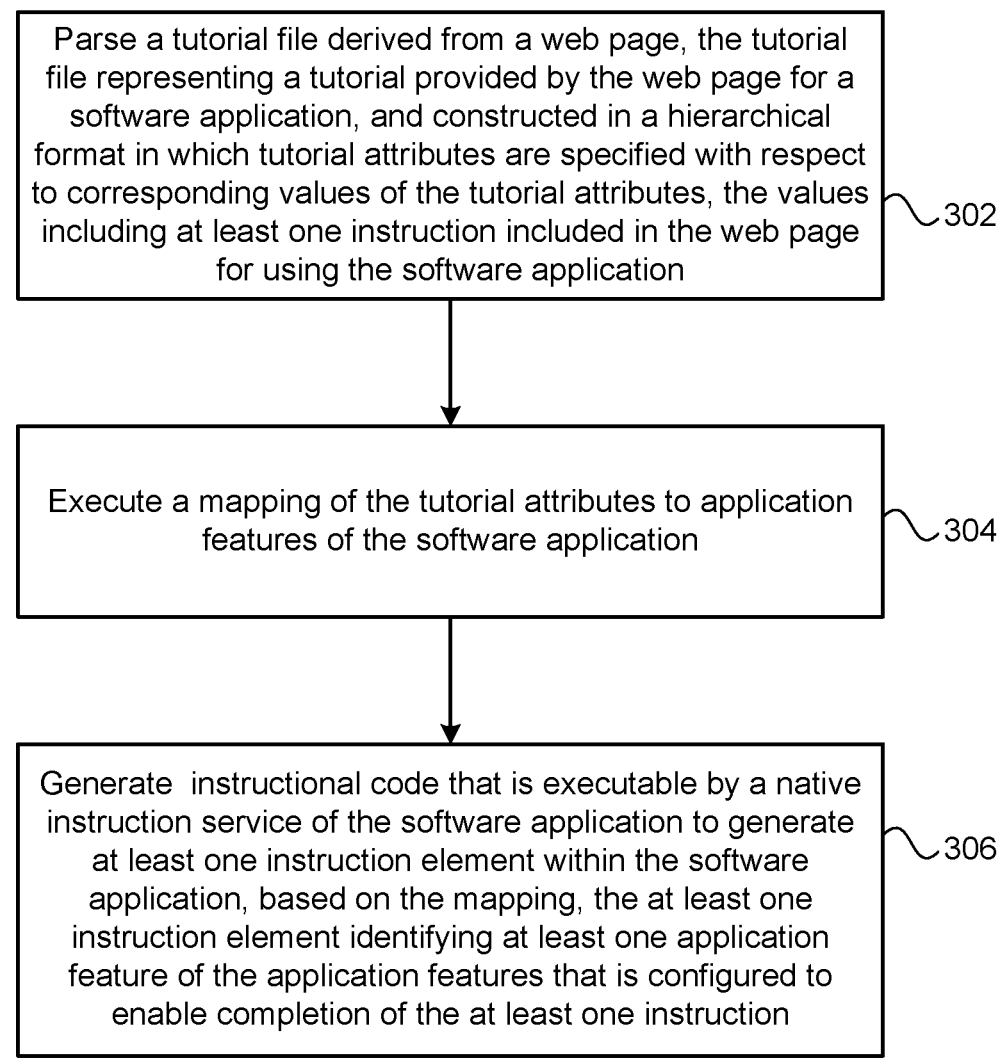
FIG. 3 is a flowchart illustrating example operations of the system of FIG. 1.

FIG. 3 is a flowchart 300 illustrating example implementations of the system 100 of FIG. 1. In the example of FIG. 3, operations 302, 304, 306 are illustrated as separate, sequential operations. In various implementations, additional or alternative operations or sub-operations may be included, and/or one or more operations or sub-operations may be omitted. In the various implementations, any two or more operations or sub-operations may be implemented in a partially or completely overlapping or parallel manner, or in a nested, iterative, looped, or branched fashion.

In the example of FIG. 3, a tutorial file derived from a webpage may be parsed, the tutorial file representing a tutorial provided by the web page for a software application, and constructed in a hierarchical format in which tutorial attributes are specified with respect to corresponding values of the tutorial attributes, and the values include at least one instruction included in the web page for using the software application (302). For example, with reference to FIG. 1, such a tutorial file may include a PTF file of the PTF files 142 that represents the tutorial 118, and that includes at least one instruction included within the tutorial 118 for using the software application 108. Tutorial attributes, as described herein, may include, e.g., a tutorial action, command, tool, procedure, step, or other characteristic that is determined to be associated with the tutorial. The software application may be associated with corresponding hardware features of a device running the software application.

A mapping of the tutorial attributes to application features of the software application may be executed (304). For example, the feature mapper 148 of FIG. 1 may be configured to execute such a mapping. In this context, it will be appreciated that some of the tutorial attributes will not include values that map directly to application features of the application 108. For example, a tutorial attribute such as "author" will not correspond to a particular tool or task of the application 108. On the other hand, as referenced above and described in detail below, instructions of the tutorial 118 for using the application 108 may include language referencing a task of the tutorial and associated tool of the application 108 for completing such a task. The feature mapper 148 is thus configured to determine a correspondence of, and relationship between, the specific instructions of the tutorial 118 and corresponding tools and other elements of the application 108.

Instructional code that is executable by a native instruction service of the software application to generate at least one instruction element within the software application may thus be generated, based on the mapping, where the at least one instruction element identifies at least one application feature of the application features that is configured to enable completion of the at least one instruction (306). For example, the instruction code generator 150 of FIG. 1 may be configured to generate instruction code to be included within the instruction code 122 of the native instruction service 120 of the application 108. As a result, the native instruction service 120 may be configured to generate an instruction element, such as the instruction element 128 illustrated with respect to the display 114 of FIG. 1. Of course, the instruction element 128 represents a simplified example for the sake of illustration, and additional, more detailed examples of such instruction elements are provided above with respect to FIG. 2, as well within the following description. For example, the instruction element may include the instruction 214 provided in FIG. 2, as well as the instructions within the coach mark 216 of FIG. 2. The image 212 may also be considered to be an instructional element, because it is used in the instructional example of the original tutorial 202 of FIG. 2.

More generally, as described herein, the referenced software application may reference any software application that, for example, includes a built-in or in-app tutorial player, and/or otherwise supports a mode in which a user may interact with a browser application that supports such a tutorial player, referred to herein as the native instruction service 120. The tutorial may also include, e.g., a video file(s), from which narrative text and selected image frames are extracted.

Thus, it will be appreciated that the system 100 of FIG. 1, and the associated example operations of FIG. 3, provide developers, administrators, and users of the system 100 with a number of advantages. For example, developers and administrators of the system 100 may be able to identify suitable tutorials for inclusion within the native instruction service 120, without requiring individual users to make individual determinations regarding an existence, availability, relevance, or quality of a desired tutorial. Further, the users are not required to follow web-based instructions from within a separate browser, and can, instead, view and interact with tutorial content from within a desired context. For example, the users may operate within a context of specific menu commands and tools of the software application 108 itself, or in the context of the user's specific workflow, using their own assets (e.g., image assets).

Further, the techniques described herein enable the capture and representation of the structure and semantics of tutorials, such as the tutorial 118. Such tutorials often have a large number of operational steps, with varying levels of detail and complexity. Such tutorials often also contain rich metadata that is not systematically captured or available for future use.

Further, authoring and providing the instruction code 122, using conventional techniques, may be a labor-intensive and expensive effort. For example, developers of the application 108, as well as third-party content producers may be enabled by the system 100 to automatically import high quality tutorials into the standard canonical tutorial representation of the PTF files 142, that can be easily converted into executable instruction code 122 for use within the native instruction service 120, as well as other native instruction services of other software applications that are compatible with the tutorial manager 132.

As a result, the described techniques automatically capture the first web tutorials across different website domains, for representation thereof within the PTF format, which preserves all of the semantics and multi-level structure of any corresponding tutorial. The captured tutorials may be executed in product-specific tutorial player systems, such as the Learn Panel system referenced above with respect to FIG. 2, thereby enabling tutorials to become interactive and in-app experiences, which can be rapidly deployed for a variety of products. Still further, by generating new instruction code to be included within the instruction code 122, additional or alternative features of the native instruction service 120 may be enabled.

For example, users may be given a choice of one or more "next steps" in which to continue the tutorial, thereby allowing sequential or disjunctive procedures or steps, as referenced and illustrated below with respect to FIGS. 5-9. Further, a mechanism may be provided to indicate a control and optionality of a given tutorial step (e.g., either required or optional), thereby allowing different degrees of the tutorial effect to be accomplished. A mechanism to indicate and select a difficulty level of a tutorial in relation to a user's skill level (e.g., basic, intermediate, or advanced) may be provided. A total time duration of a tutorial that is desired may be indicated, as well. As a final example, support may be provided for indicating and defining important terms mentioned within the tutorial to augment terminology learning during the tutorial.

Figure 4:
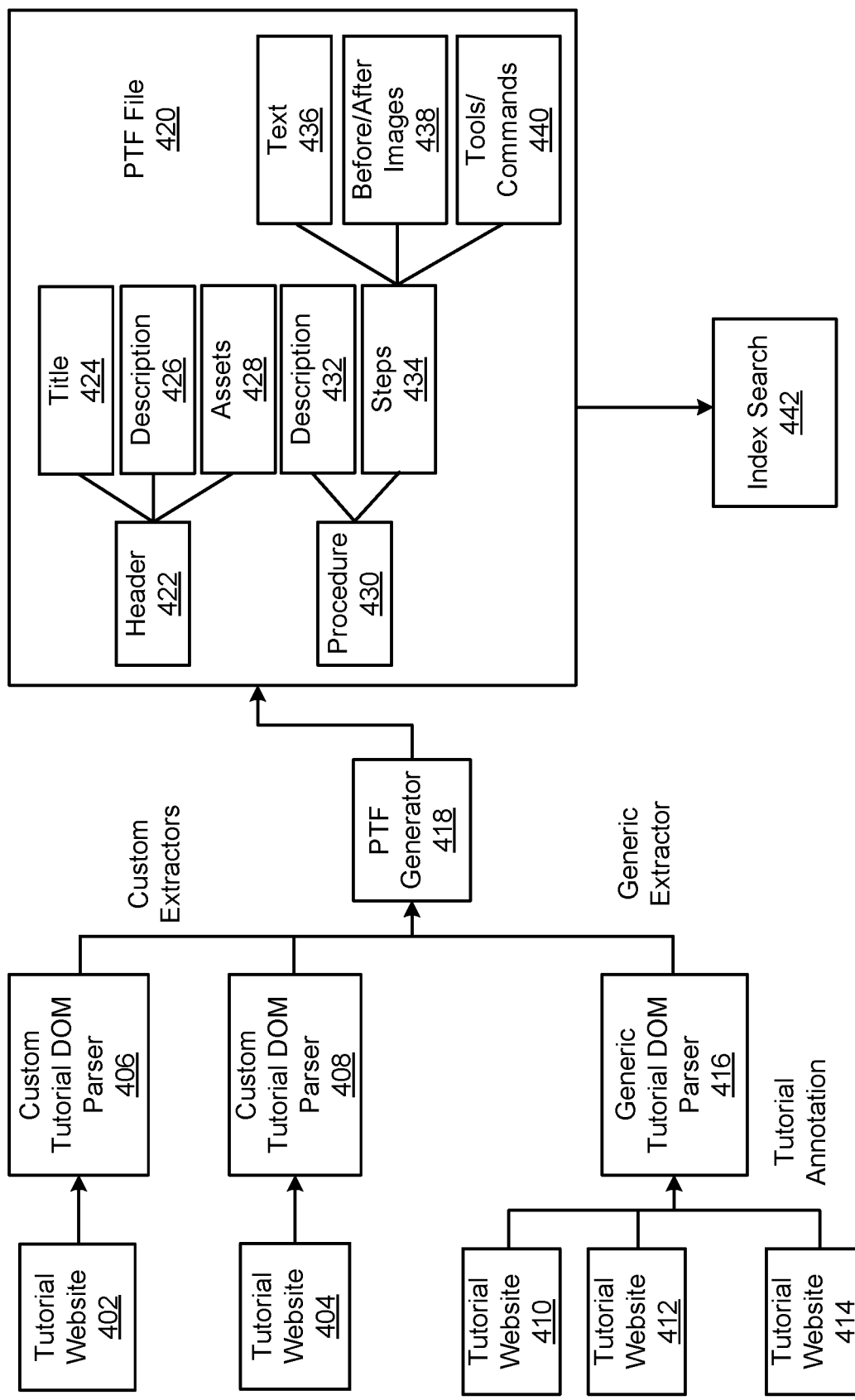
FIG. 4 is a block diagram illustrating generation of a portable tutorial format (PTF) file.

FIG. 4 is a block diagram illustrating more detailed example implementations of the system 100 of FIG. 1. In particular, FIG. 4 is a block diagram illustrating more detailed example implementations of the tutorial annotator 134, the tutorial extractor 136, and the PTF generator 140.

As shown, FIG. 4 illustrates a tutorial website 402 and a tutorial website 404. A customized tutorial document object model (DOM) parser 406 is illustrated with respect to the tutorial website 402, while a custom tutorial DOM parser 408 is illustrated with respect to the tutorial website 404. The parsers 406, 408, as described in detail below, represent an advanced, structured text extraction pipeline(s) that is configured to parse the corresponding tutorial websites 402, 404, notwithstanding the fact that the tutorial websites may have varying tutorial formats, as well as different levels of hierarchy. In the example of FIG. 4, it is assumed that the tutorial websites 402, 404 represent relatively large scale tutorial websites that include a number of individual tutorial webpages and associated tutorials for the software application 108 of FIG. 1, and perhaps other software applications, as well. In such scenarios, the various tutorial webpages may have similar semantics and structure, as a result of being included within a corresponding website.

Consequently, for example, the custom tutorial DOM parser 406 may be trained, using the model trainer 144 of FIG. 1, to parse the tutorial website 402 and perform customized text mining of the website 402. For example, an extraction template may be learned and constructed, and then applied to the desired webpage of the tutorial website 402.

In more detail, for example, the custom tutorial DOM parser 406 may be configured to transform the tutorial content into a specialized markdown markup representation, in which the content is annotated in the manner described above with respect to FIG. 1, and described in more detail, below, with respect to FIG. 11.

Through use of the model trainer 144, the custom tutorial DOM parser 406 may be configured to derive structures of the tutorial content, such as a procedure level hierarchy or a step level hierarchy, based on the markdown language annotations. The resulting, annotated tutorial content and structures may be classified according to an existing library of tutorial model structures, examples of which are provided below, with respect to FIGS. 5-9.

FIG. 4 further illustrates tutorial websites 410, 412, 414, which generally represent the large number of tutorial websites that may be available on the internet, but for which customized parsers have not yet been constructed. In such scenarios, a base extractor and associated template may be utilized to construct, for each new tutorial website 410, 412, 414, a clone of the base template to be used for annotating, parsing, classifying, and extracting content of a corresponding tutorial website. For example, the model trainer 144 may be configured to implement a one shot learning process of a tutorial structure of the tutorial website 410 from the obtained markdown markup representation of the content of the tutorial website, and thereby accelerate a cloning process of the base template. Accordingly, configuration of the generic tutorial DOM parser 416 for a specific tutorial website may leverage existing logic for performing web crawling, HTML extraction, and markdown markup generation already used with respect to the parsers 406, 408.

Further in FIG. 4, a PTF generator 418 is configured to receive all of the extracted, annotated tutorial content, in any of the various formats of the tutorial websites available on the Internet (represented by the tutorial websites 402, 404, 410-414), and generate a PTF file 420. As may thus be observed, the PTF file 420 represents a standardized, universal format, regardless of an original tutorial format of the tutorial content being represented.

In example implementations, the PTF generator 418 may be trained by the model trainer 144 to classify a structure of each tutorial into, e.g., one of the five example structures of FIGS. 5-9. As illustrated in the simplified example PTF file 420 of FIG. 4, as well as in more detail with respect to the example PTF file of FIG. 10, the PTF file 420 may be generated in a hierarchical format, which corresponds generally to a hierarchical structure of an underlying tutorial, as captured within one of the structural models of FIGS. 5-9.

For example, the PTF generator 418 may handle the types of hierarchy observed within the various tutorials by analyzing the tutorial content using a bottom-up model. For example, the PTF generator 418 may begin by identifying individual sentences, and then identifying references within the sentences to other sentences. The related sentences may be grouped into the step, to determine step partitioning.

Similarly, the steps may be grouped into a procedure to determine procedure structure, multiple procedures may thus be determined and enumerated. In this way, the tutorial hierarchy may be determined.

As referenced, the PTF file 420 illustrates a simplified example of the type of hierarchical format described herein. As shown, a header 422 may reference a title 424, a description 426, and one or more assets 428 of the underlying tutorial. That is, each of the header 422, title 424, description 426, and assets 428 represent attributes of the underlying tutorial, and of tutorials in general, and will have specific values for those attributes assigned as part of the PTF generation process. For example, the description 426 may be obtained from a description field of an underlying webpage, or may be generated using the PTF generator 418. The assets 428 may represent specific files used within the tutorial for example, illustration, or instruction, such as image or video files.

As also referenced above, an instructional hierarchy of a tutorial may be captured as a procedure 430 having an associated description 432 and plurality of steps 434. As shown, each step may include text 436, before/after images 438, and various tool/commands 440 used in conjunction with the corresponding step. It will be appreciated at this stage that the tools/commands 440 may not be expressed in terms of specific tools or commands of the software application 108. For example, the PTF file 420 may be constructed in a manner that is generic with respect to two or more software applications and associated native instructional services, so that the PTF file 420 may be used to generate instruction code for either or both such applications.

In other cases, even when the PTF file 420 is primarily utilized with respect to a specific application, it may occur that the expressed tools and commands may be included in a manner that is not highly specific with respect to the corresponding tools and commands of the software application itself. For example, names for the tools and commands may be provided in an informal, imprecise, or potentially ambiguous manner with respect to corresponding features of the feature list 130 of the application 108.

Techniques for disambiguating and otherwise clarifying and understanding the tools and commands 440 are provided below. With respect to FIG. 4, however, it will be appreciated that the hierarchical format of the PTF file 420 nonetheless captures the instructional sequence of the content of the underlying tutorial in a standardized, universal manner. Further, of course, although not explicitly illustrated in the simplified example of FIG. 4, it will be appreciated that the PTF file 420 may include a plurality of procedures, perhaps included within even higher levels of hierarchy, such as sub-tutorials, chapters, or other designated content groupings.

FIG. 4 also illustrates an index search 442 as an example of an additional or alternative use of the PTF file 420. Specifically, for example, the index search 442 may represent a web service that enables searches of tutorials or other webpages. As the PTF file 420 includes annotations and other details regarding the semantics and structure of the corresponding, underlying tutorial, the index search 442 is enabled to provide searching across such attributes and associated values.

Figure 5:
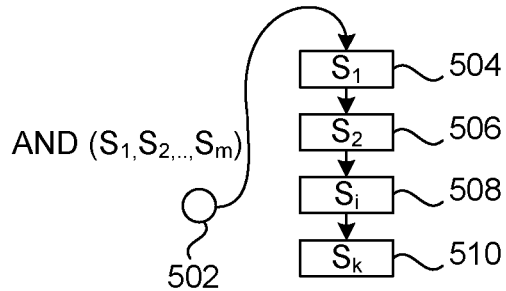
FIG. 5 is a flow diagram illustrating a first example of a tutorial structure model.

As referenced above, FIGS. 5-9 illustrate examples of the types of tutorial structures that may be classified in conjunction with generating the PTF file 420. Specifically, FIG. 5 illustrates a conjunctive, sequential structure having one level, non-hierarchical step structure. In other words, as shown, after an initial node 502, the steps proceed with a simple sequence of steps 504, 506, 508, and 510. For example, the example of FIG. 5 may be implemented in scenarios in which a user is provided with a first instruction corresponding to step 504, the user complies with the instruction, and the subsequent instruction 506 has been provided. Thus, for example, each of the steps 504-510 may be associated with a single task, tool, action, or command associated with a corresponding application feature of the application 108.

Figure 6:
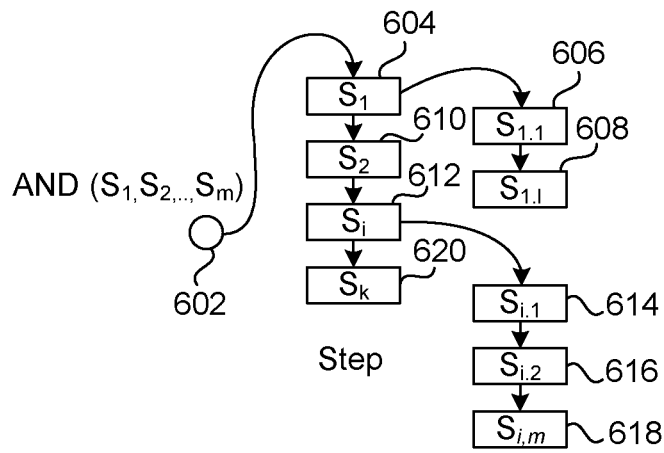
FIG. 6 is a flow diagram illustrating a second example of a tutorial structure model.

In the example of FIG. 6, a structure having conjunctive sequential steps is illustrated, in which any particular step may include sub-steps, e.g., may include multiple sentences and associated tools, tasks, or other actions. As illustrated, after an initial node 602, instructions may proceed with step 604. As illustrated, step 604 may have sub-steps 606, 608, before the structure proceeds to a step 610, followed by a step 612. As shown, the step 612 has sub-steps 614, 616, 618, whereupon the structure ultimately concludes with a final step 620.

Figure 7:
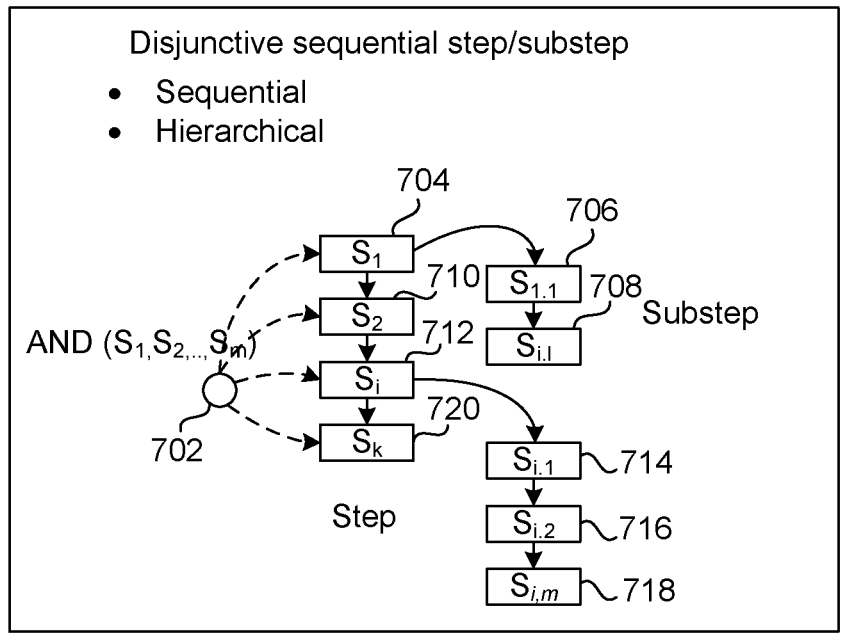
FIG. 7 is a flow diagram illustrating a third example of a tutorial structure model.

Thus, FIGS. 5 and 6 provide examples of conjunctive structures, in which all steps and sub-steps are required in order to proceed to subsequent steps or sub-steps. In contrast, FIG. 7 illustrates a structure model that is disjunctive, so that not all steps or sub-steps are required. For example, users may make choices regarding which step to execute next.

As shown, after an initial node 702, a user may proceed to step 704, which may include sub-steps 706, 708. Alternatively, the user may proceed to a step 710, or to a step 712. As shown, the step 712 includes sub-steps 714, 716, 718. A final option is represented as a step 720. As may be appreciated from the example of FIG. 7, the user may begin with any of the steps 704, 710, 712, 720, and thereafter proceed to subsequent steps and/or sub-steps, if any. More generally, the user may have the option of selecting from any of the steps 704, 710, 712, 720, and any included sub-steps, and is not required to follow any particular order, or complete any particular number or percentage of steps.

Figure 8:
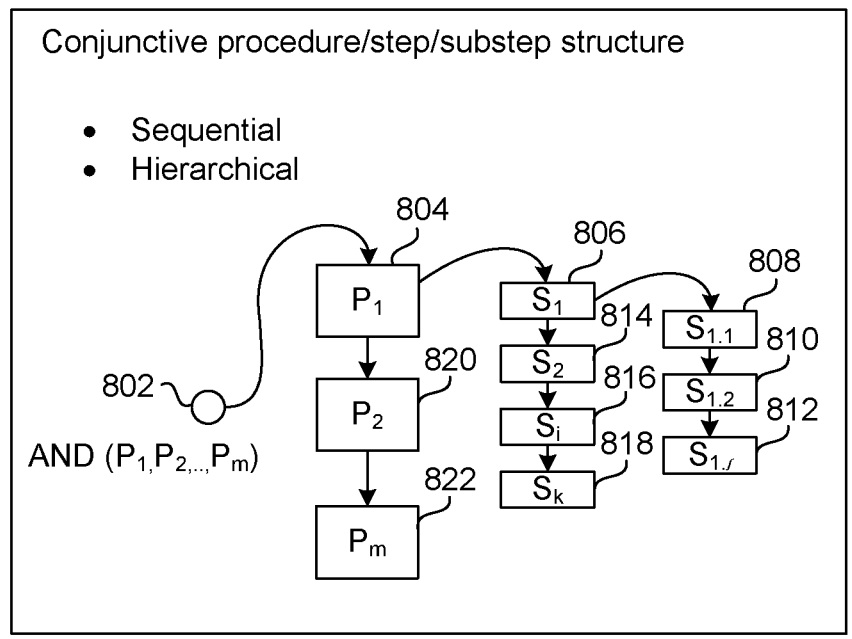
FIG. 8 is a flow diagram illustrating a fourth example of a tutorial structure model.

In the example of FIG. 8, a structure model is illustrated in which sequential steps may be grouped into procedures. As shown, after an initial node 802, a first procedure 804 may include a step 806, which may itself include sub-steps 808, 810, 812. The procedure 804 also may include steps 814, 816, 818. A subsequent procedure 820 may follow the first procedure 804, and ultimately lead to a final procedure 822.

Figure 9:
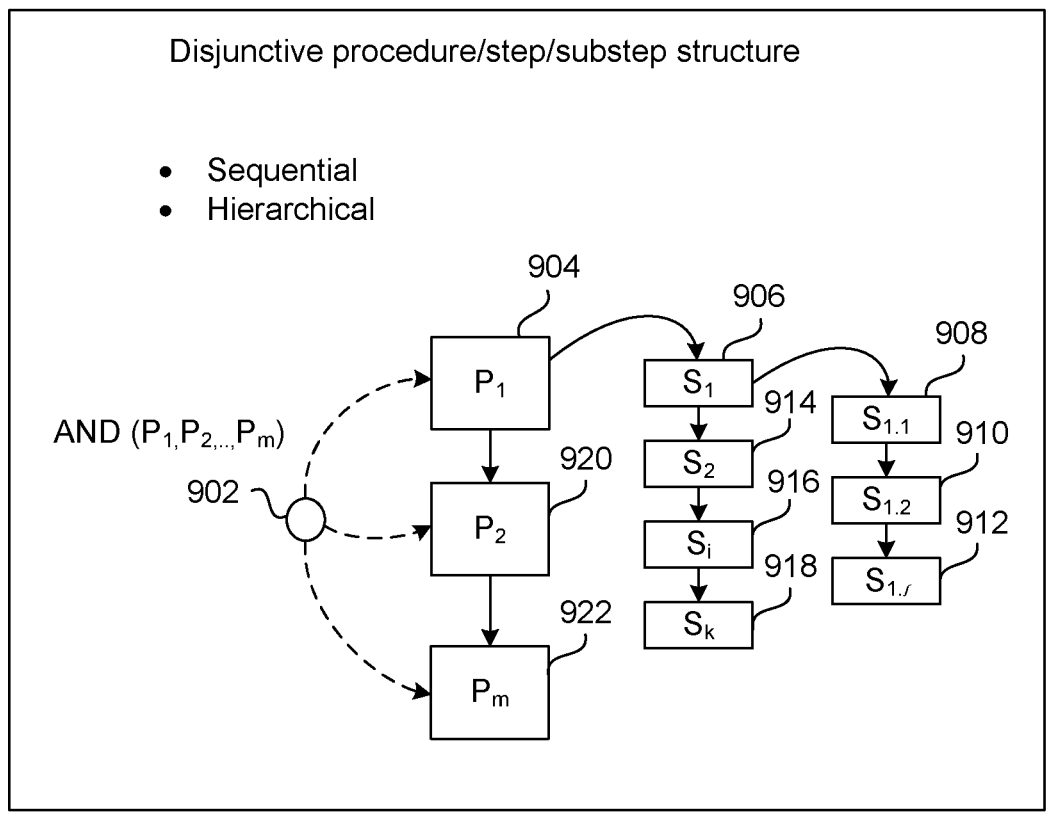
FIG. 9 is a flow diagram illustrating a fifth example of a tutorial structure model.

FIG. 9 provides a final, non-limiting example of the type of structure model that may be used when generating the PTF file 420. As shown, FIG. 9 is similar to the example of FIG. 8, but provides a disjunctive example of a procedure structure with steps and potential sub-steps. As shown, after an initial node 902, a procedure 904 may include a step 906, which includes sub-steps 908, 910, 912. The procedure 904 also includes the steps 914, 916, 918. The example of FIG. 9 also includes procedures 920 and 922. Similar to FIG. 7, the procedures 904, 920, 922 should be understood to be alternative or optional procedures that may be chosen by the user, and may be executed in the order shown, or in a different order.

For example, in some scenarios, a particular procedure or instruction may be designated as optional. Similarly, in other examples, particular procedures or steps may be associated with designated levels of skill or experience of a user. For example, a particular procedure or step may be designated for implementation by an expert user, but designated for being skipped a novice or intermediate user.

Figure 10:
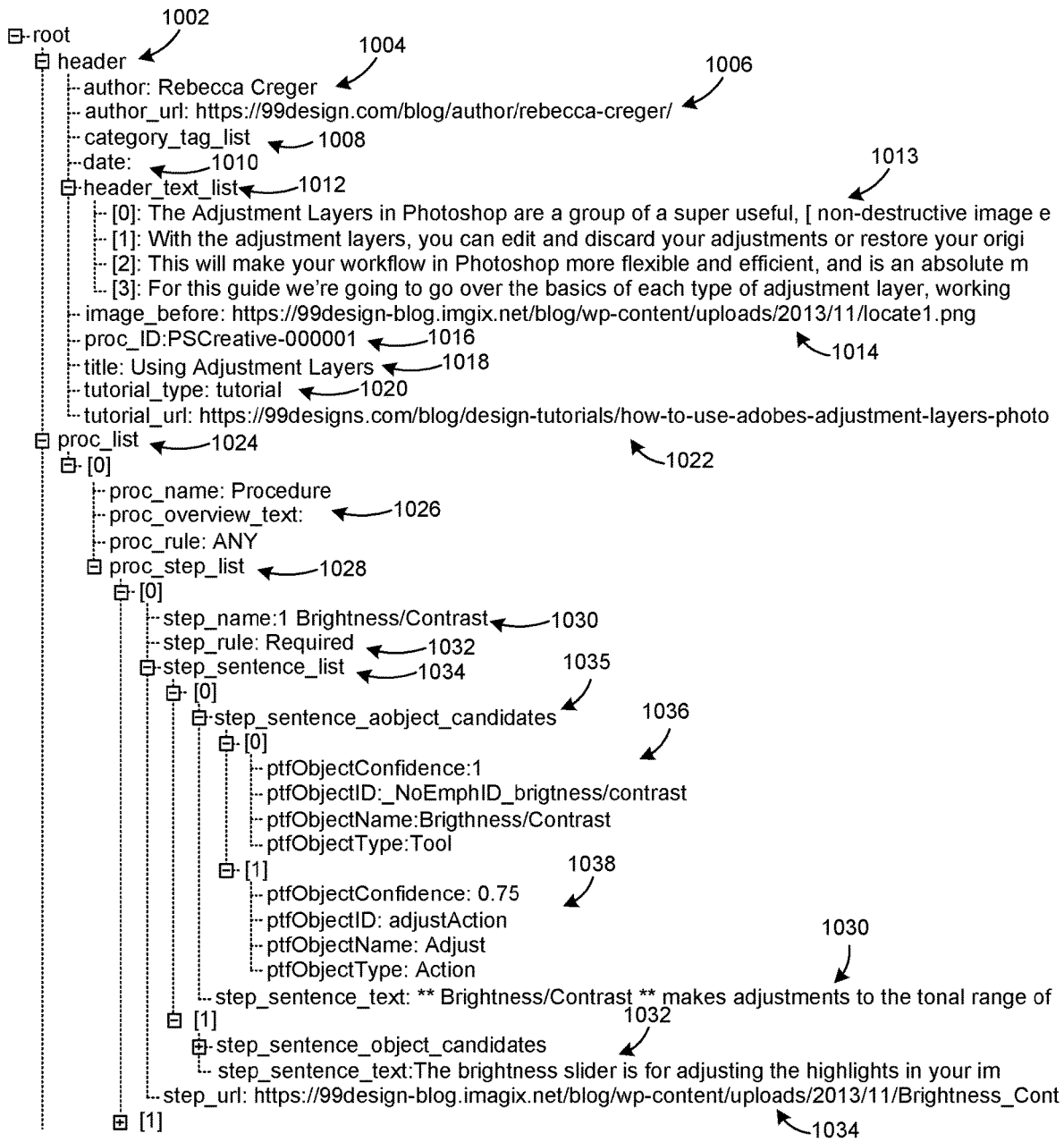
FIG. 10 illustrates an example portion of a PTF file, used in the systems of FIGS. 1 and 4.

FIG. 10 is an example of a file portion 1000 of a PTF file, such as the PTF file 420 of FIG. 4. In the example of FIG. 10, a header 1002 includes a line 1004 in which the attribute author has a value "Rebecca Creger." A line 1006 provides an example of an attribute for an author url and an associated value of a specific website link. The website link thus provides an example of a resource that may be accessed by the user, even when operating within the context of the application 108. Further, for example, it will be appreciated that the information and values from the lines 1004 and 1006 may be provided by the native instruction service 120. For example, it may be required and desirable to provide attribution to the author or other source of the tutorial content when providing the tutorial content within the context of the native instruction service 120 and the application 108. Of course, as also described herein, inclusion of the author and related or similar metadata enables indexing and search across such included attributes, as well.

Further in FIG. 10, a line 1008 enables inclusion and identification of a category of the underlying tutorial, while a line 1010 enables an inclusion of a date of origin of the tutorial. A line 1012 provides for inclusion of a header text, illustrated as header text 1013. As shown, the text 1013 may provide a description of the subject matter of tutorial. Meanwhile, a line 1014 references a URL for a resource used by the tutorial in question, in this case an example of a url for a "before" image used in the tutorial. A line 1016 provides an identifier for a procedure, "proc_ID." A line 1018 provides a title of the tutorial, "using adjustment layers." A line 1020 provides a type designation for the tutorial, e.g., "tutorial." Finally with respect to the header section 1002, a line 1022 provides for inclusion of a source URL of the tutorial. Again, the source URL of the line 1022 may be provided for purposes of reference and attribution (e.g., for purposes of copyright protections) when implementing the system 100 of FIG. 1.

Further in FIG. 10, a line 1024 designates the beginning of a list of procedures of the tutorial. A section 1026 provides a name and overview of the procedure, as well as a designation of a role of the procedure as conjunctive or disjunctive, in accordance with the previous examples of FIGS. 5-9. Specifically, a designation of "any," as in the example of FIG. 10, designates a disjunctive, e.g., optional, set of steps within the procedure. In other examples, a designation of a procedure rule as "all" would designate a conjunctive procedure list.

A line 1028 designates a beginning of a list of steps of the procedure in question. As shown, a line 1030 includes a name of a first included step, while a line 1032 designates the step as being required or not required. A line 1034 designates a beginning of a list of sentences within the step.

As shown in FIG. 10, a line 1035 indicates a section for characterizing each sentence of a referenced step with respect to inclusion within a PTF object. In this regard, as described in detail below with respect to FIGS. 12 and 13, such a PTF object represents a candidate for possible mapping to one or more of a plurality of application features of a corresponding software application(s), such as menu commands, tool names, icons, panels, gallery names, and other application features. Each such PTF object may thus have a PTF object ID determined from a master dictionary of application features for the corresponding application(s), examples of which are provided below, for the purpose of providing a consistent and uniform method for referencing chosen commands of the software application in question (e.g., Adobe Photoshop).

Specifically, as shown, a section 1036 characterizes a sentence with respect to a PTF object related to brightness or contrast, including characterizing the PTF object as being related to a tool for changing brightness/contrast within the application 108, such as already referenced with respect to FIG. 1 and the contrast button 126 of the display 114. As shown, a confidence level (e.g., normalized to arrange between 0 and 1) may be given with respect to a degree of confidence in characterizing the sentence accordingly. A section 1038 illustrates that multiple PTF objects may be designated with respect to a given step and/or sentence. As shown, this section 1038 references a potential PTF object related to performing an adjustment action. A line 1030 includes text from the referenced sentence of the relevant step. In the example, the sentence text references the use of brightness/contract to make adjustments to an image.

Finally in FIG. 10, a section 1032 references a subsequent section for identifying object candidates of a subsequent step sentence, including text of the referenced sentence. A line 1034 provides a URL at which the step may be located/retrieved.

Figure 11:
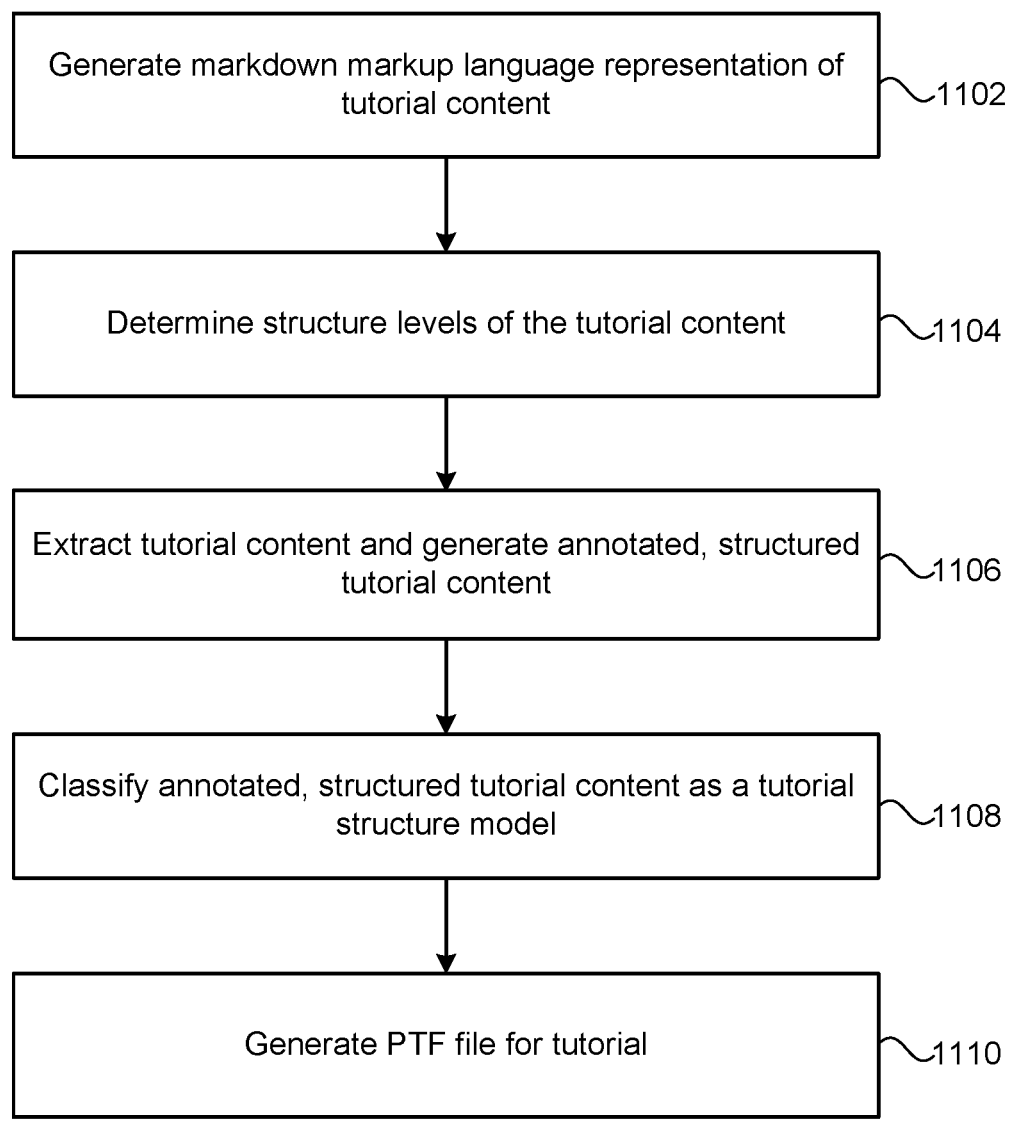
FIG. 11 is a flowchart illustrating detailed example implementations of the system of FIG. 4.

FIG. 11 is a flowchart 1100 illustrating more detailed example operations of the system of FIG. 4, with reference to the examples of FIGS. 5-10. In the example of FIG. 11, a markdown markup language representation of tutorial content is generated (1102). For example, as referenced above, the markdown language is a type of markup language and syntax that may be useful in adding the types of annotations referenced above and useful in determining attributes and associated values of tutorial content. In particular, as described, the tutorial content may have a wide range and variety of formats, structures, levels of hierarchy, and other characteristics. The model trainer 144 may be configured to use example, selected tutorial websites for training the tutorial annotator 134 to generate the markdown markups of the tutorial content.

By analyzing the generated markdown markup annotations, the structure levels of the tutorial content may be determined (1104). The tutorial content may then be extracted, so that annotated, structured tutorial content may be generated (1106). For example, the tutorial extractor 136 may use one or more templates for such extraction processes, including one or more templates cloned from at least one base extraction template.

The annotated, structured tutorial content may then be classified according to a tutorial structure model (1108). For example, the PTF generator 140 of FIG. 1 may classify annotated tutorial content 138 according to one of the five structure models of FIGS. 5-9. Finally in FIG. 11, a PTF file for the tutorial may be generated (1110). For example, the PTF generator 140 of FIG. 1, or the PTF generator 418 of FIG. 4, may be configured to generate the PTF file 420 of FIG. 4, or the PTF file corresponding to the pseudo code of FIG. 10.

Figure 12:
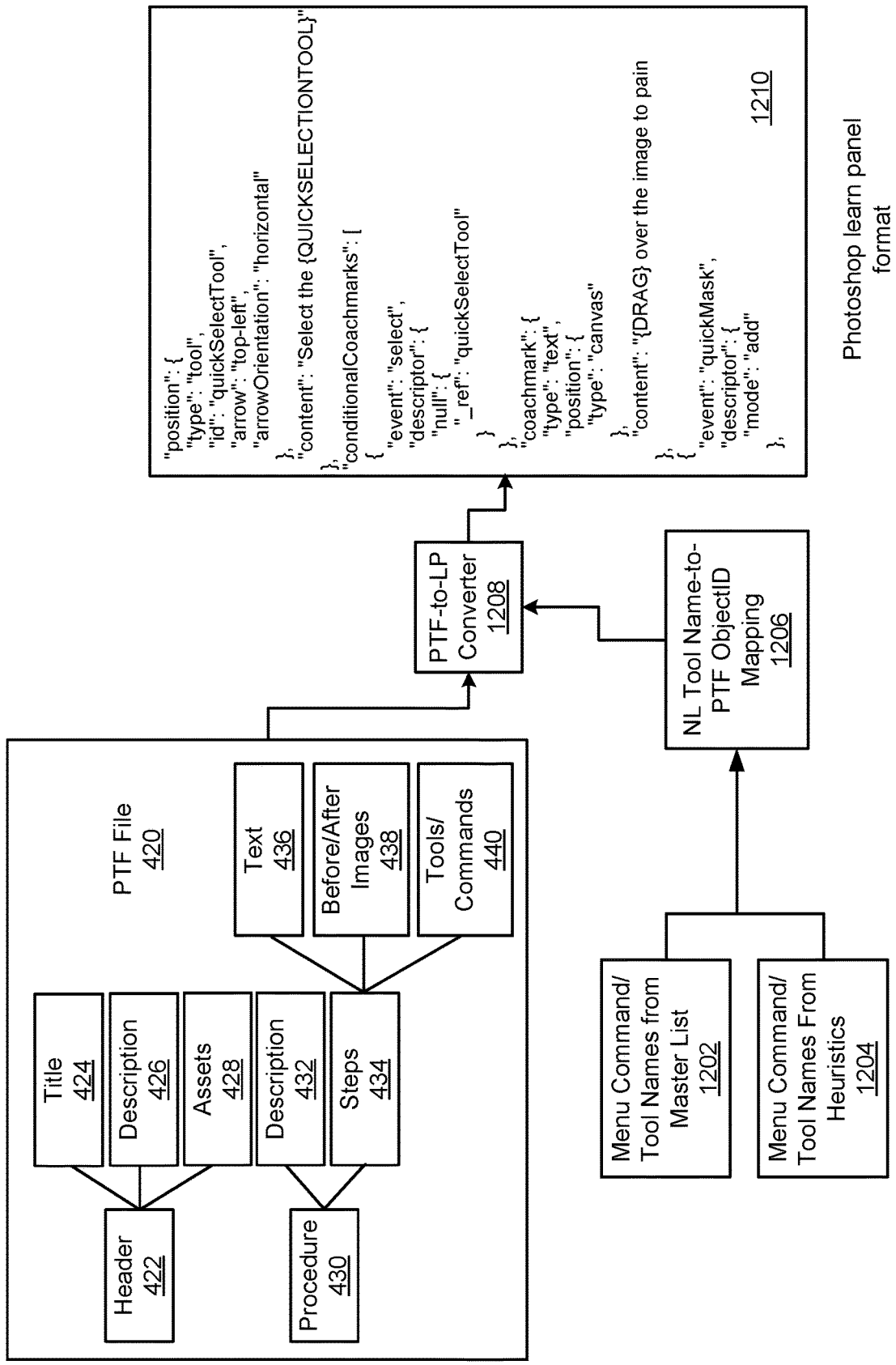
FIG. 12 is a block diagram illustrating generation of executable instruction code, using the PTF file of FIG. 4.

FIG. 12 is a block diagram illustrating more detailed example implementations of the tutorial manager 132 of FIG. 1. More specifically, FIG. 12 illustrates more detailed example operations of the feature extractor 146, the feature mapper 148, and the instruction code generator 150 of FIG. 1, with respect to the subsequent examples of FIGS. 2-11.

Specifically, FIG. 12 continues examples in which the application 108 is represented by the Adobe Photoshop software application, and the native instruction service 120 is represented by the Learn Panel tutorial player of Adobe Photoshop. In these examples, as already referenced, the instruction code 122 may refer to a Java Script Object Notation (JSON) object that is executable by the native instruction service 120. Consequently, in the example of FIG. 12, a JSON object 1210 is produced, that would be executable by the Photoshop Learn Panel tutorial player.

In FIG. 12, the PTF file 420 of FIG. 4 is converted to the executable instruction code 1210 through the use of one or more lists of application features of the Photoshop software application. Specifically, as referenced above and illustrated in more detail with respect to FIG. 12, a list 1202 of menu commands/tool names determined from a master list, such as the feature list 130 of FIG. 1, may be utilized. In other words, in scenarios in which the relevant software application provides a partial or complete listing of application features, the list may be referenced by the PTF file 420 and leveraged by the executable code 1210. When available, the list 1202 may thus be extracted from the relevant application, using any appropriate or available interface.

On the other hand, as also referenced above, a list 1204 may represent menu commands, tool names, and other application features that may not be (explicitly) available or provided within a list such as the feature list 130. Instead, as referenced above and illustrated in the example of FIG. 12, such application features may be determined heuristically, and through the use of natural language processing (NLP) and other machine-learning techniques.

In FIG. 12, a mapping 1206 is determined that it is configured to translate application features, such as menu commands, tool names, icons, panels, gallery names, and other application features into a PTF object ID. As referenced above with respect to FIG. 10, an object ID is an element of a PTF file determined from a master dictionary for the purpose of providing a consistent and uniform method for referencing chosen commands of the software application in question (e.g., Adobe Photoshop). As referenced, in order to create and utilize such a mapping, the PTF generator 418 may be configured to train and implement algorithms for learning and recognizing both formal and informal (e.g., natural language) tool and command names within tutorial content.

Using the mapping 1206, a converter 1208 may be configured to convert the PTF file 420 into the Learn Panel (LP) code 1210. As described, the resulting Learn Panel code may be executed by the Learn Panel tutorial player to create interactions with the user of the relevant tutorial within the context of the Adobe Photoshop software application. Such interactions may include the use of coach marks (e.g., transparent overlays of UI hints), as well as specific item highlighting actions performed in conjunction with user actions, such as the highlighting 128 of the contrast button 126 in FIG. 1.

Figure 13:
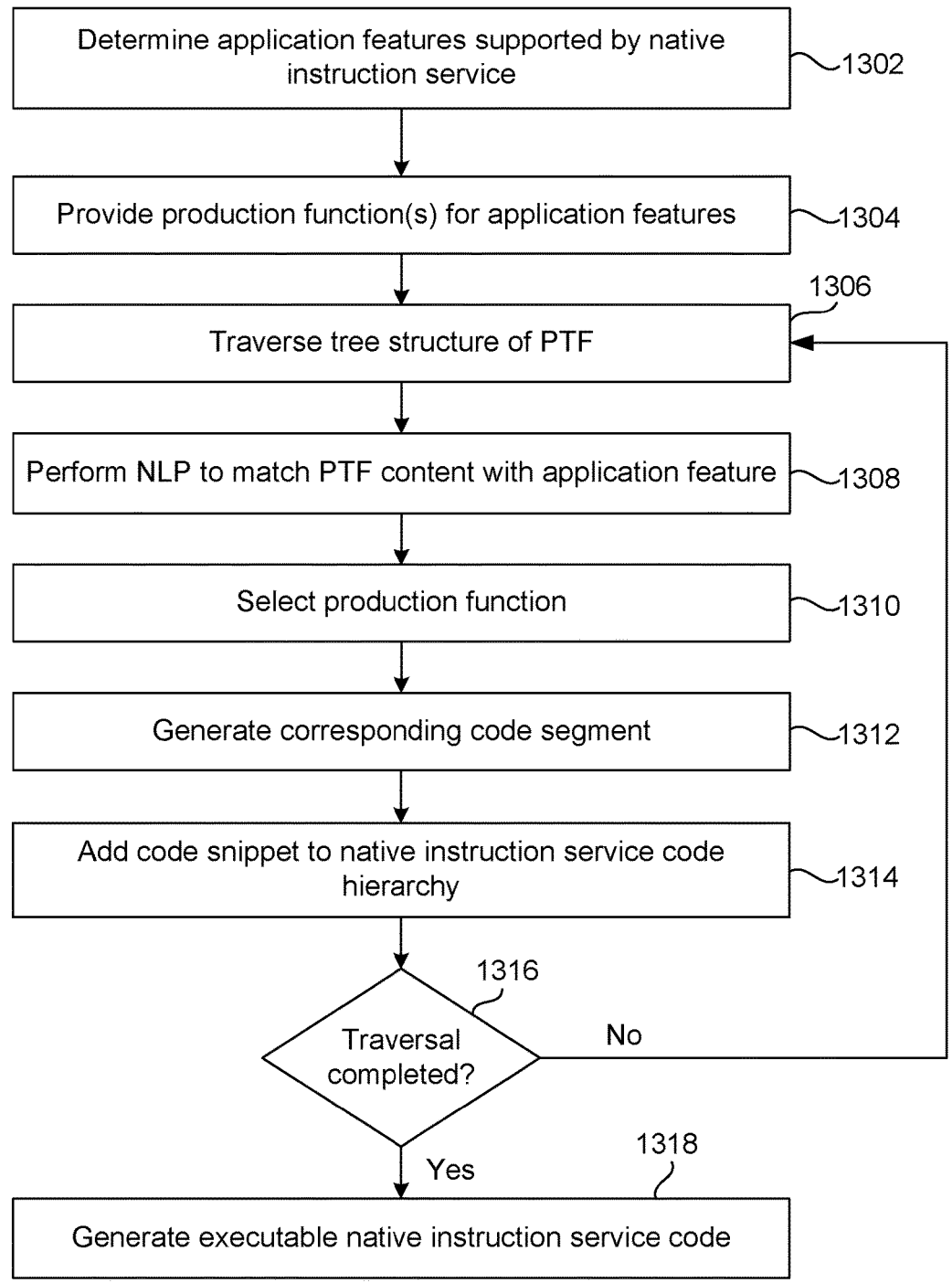
FIG. 13 is a flowchart illustrating detailed example implementations of the system of FIG. 12.

FIG. 13 is a flowchart 1300 illustrating more detailed example operations of the block diagram of FIG. 12. In the example of FIG. 13, operations may begin before any particular instance of a PTF file is received. In particular, an application feature supported by a native instruction service may be determined (1302). Then, a production function for a corresponding application feature may be provided (1304).

More specifically, such production functions, also referred to as callback functions, represent a library of functions designed to generate executable code for corresponding application features. As described in detail below, various ones of such production functions may thus be utilized, on an as-needed basis, during subsequent processes of converting individual instances of PTF files into corresponding code portions of instruction code.

Particularly, as a PTF file is received, a tree structure of the PTF file may be traversed (1306). For example, the converter 1208 of FIG. 12 may be configured to execute a recursive descent algorithm to traverse the PTF file 420, in which parsing proceeds from a root node to each leaf node of the PTF file 420, to thereby decompose/deconstruct the PTF file 420 and select the portions thereof that are specific to the relevant native instruction service 120 (e.g., the Photoshop Learn Panel tutorial player). That is, for example, each sentence of each step will typically be expressed in a natural language format, but will reference actions (e.g., click, select, or crop) and tools (e.g., paintbrush tool, crop tool, or other Adobe Photoshop tools).

Upon identifying a portion of the PTF file tree that corresponds to a particular application feature, using the mapping 1206 (1308), the converter 1208 may proceed to identify and select a corresponding production function of the library of production functions (1310). A corresponding code segment of the instruction code 1210 may thus be generated by the production function (1312), and the resulting code snippet may be added to a hierarchy of the corresponding native instruction service code (1314). In other words, the recursive descent traversal of the original PTF file tree preserves the structure of the PTF file tree, and performs a tree-to-tree mapping that results in a corresponding hierarchical representation of the resulting instruction code 1210.

If the traversal of the PTF file tree is not completed (1316), then the traversal will continue, with corresponding generation of relevant portions of the instruction service code 1210 (1306-1314). Once the traversal is completed (1316), then the generated code snippets may be utilized to generate the executable native instruction service code 1210 (1318).

Pseudo code 1 illustrates example logic of an algorithm for creating one or more tasks to be included within the executable native instruction service code 1210. Specifically, as shown in pseudo code 1, if a PTF object in a list of step sentences is determined not to include a tool of the corresponding native instruction service/Learn Panel tutorial player, then a text of the sentence may be included in descriptive text. If an actionable tool is determined to exist within the step sentence, then a corresponding task may be generated. If a tool is identified but is not actionable, then a corresponding task may be generated but identified as mandatory false. On the other hand, for actionable tools, each task and the resulting list is labeled actionable, mandatory true.

PSEUDO CODE 1

```
# algorithm: logic for when to create a task and when not to
# description: if there are no tools at all they everything goes into description. Create
new task when encountering something actionable. Create one task per actionable tool.
If there are tools but none are actionable then create one task, mandatory false. If
there are actionable tools, then each task in the tasklist is actionable, mandatory true.

# previous = -1 (index into tasklist)
```

PSEUDO CODE 1

```
# for each object in step_sentence_list
#   if there is a tool present
#     if previous == -1 //if there are no tasks at all
#       create very first task object
#       set description of task object to "alltext" + step_text
#       set previous = 0
#       if there are actionable tools
#         set actionable_tools_present = True
else
#       if none of the tools are actionable (make function that returns the index of first actionable tool)
#         add step_text to previous task object description tasks[previous].get("description")
#         continue

#       if actionable_tools_present == False
#         add step_text to previous task object description tasks[previous].get("description")
#       else
#         create task object
#         set description of task object to step_text
#         set previous += 1
#       set actionable_tools_present = True
else
#     if previous == -1 //if there are no tasks at all
#       add sent_text to alltext
#     else
#       add step_text to previous task object description tasks[previous].get("description")

#if previous == -1, then alltext goes into content description, no task list

```

Although the above description has provided a number of example implementations, other extensions and variations are contemplated. For example, Attributes for indicating tutorial skill level, estimated duration to completion, and step optionality may be captured into the PTF and exported to the Learn Panel JSON. These extensions allow the tutorial experience to be customized for novice users, as well as users with varying experience and skills.

Also, mechanisms may be provided by which users have a choice of one or more "next steps" in which to continue the tutorial. Mechanisms may be provided to indicate and control the optionality of a tutorial step (either required or optional), allowing different degrees of the tutorial effect to be accomplished. Further, mechanisms may be provided to indicate and select the difficulty level of a tutorial depending on the user's skill (basic, intermediate, advanced) and/or total time duration desired. In additional or alternative examples, support may be provided for indicating and defining important terms mentioned in the tutorial to augment terminology learning during the tutorial.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    extract tutorial content from a web page providing a tutorial for a software application;
    generate a tutorial file from the tutorial content, including identifying structure levels of the tutorial content, the tutorial file representing the tutorial, and constructed in a hierarchical format in which tutorial attributes are specified with respect to corresponding values of the tutorial attributes, the values including at least one instruction included in the web page for using the software application, wherein the identified structure levels are included in the hierarchical format, and the structure levels are classified with respect to a collection of tutorial structure models that determine conjunctions or disjunctions between tutorial steps of the tutorial;
    execute a mapping of the tutorial attributes to application features of the software application; and
    generate instructional code that is executable by a native instruction service of the software application to generate at least one instruction element within the software application, based on the mapping, the at least one instruction element identifying at least one application feature of the application features that is configured to enable completion of the at least one instruction.

2. The computer program product of claim 1, wherein the hierarchical format includes at least one procedure having a plurality of tutorial steps of the tutorial, and one of the plurality of tutorial steps includes the at least one instruction.

3. The computer program product of claim 2, wherein the one of the plurality of tutorial steps includes an identifier identifying the at least one application feature from among a list of the application features.

4. The computer program product of claim 1, wherein the instructions, when executed to execute the mapping, are further configured to cause the at least one computing device to:
    perform natural language processing (NLP) of the tutorial attributes to thereby relate each tutorial action attribute to an application feature of a standardized list of names of the application features.

5. The computer program product of claim 1, wherein the instructions, when executed to generate the instructional code, are further configured to cause the at least one computing device to:
    determine the plurality of application features;
    store a plurality of production functions for the plurality of application features, each production function configured to generate a code portion of the instructional code for a corresponding application feature.

6. The computer program product of claim 5, wherein the instructions, when executed to generate the instructional code, are further configured to cause the at least one computing device to:
    traverse the hierarchical format of the tutorial file to select a tutorial attribute and corresponding value, the corresponding value including the at least one instruction;
    identify a production function of the plurality of production functions that corresponds to the at least one instruction; and
    generate a code portion of the instruction code, based on the production function.

7. The computer program product of claim 1, wherein the at least one application feature includes a tool or action function of the software application.

8. The computer program product of claim 1, wherein the at least one application feature includes an action to be performed to complete the at least one instruction, using a tool of the software application.

9. A computer-implemented method, the method comprising:
    extracting tutorial content from a web page providing a tutorial for a software application;
    generating a tutorial file from the tutorial content, including identifying structure levels of the tutorial content, the tutorial file representing the tutorial, and constructed in a hierarchical format in which tutorial attributes are specified with respect to corresponding values of the tutorial attributes, the values including at least one instruction included in the web page for using the software application, wherein the identified structure levels are included in the hierarchical format;
    classifying the structure levels with respect to a collection of tutorial structure models that determine conjunctions or disjunctions between tutorial steps of the tutorial;
    executing a mapping of the tutorial attributes to application features of the software application; and
    generating instructional code that is executable by a native instruction service of the software application to generate at least one instruction element within the software application, based on the mapping, the at least one instruction element identifying at least one application feature of the application features that is configured to enable completion of the at least one instruction.

10. The method of claim 9, wherein the executing the mapping comprises:
    performing natural language processing (NLP) of the tutorial attributes to thereby relate each tutorial action attribute to an application feature of a standardized list of names of the application features.

11. The method of claim 9, wherein the generating the instructional code comprises:
determining the plurality of application features;
storing a plurality of production functions for the plurality of application features, each production function configured to generate a code portion of the instructional code for a corresponding application feature.

12. The method of claim 11, wherein the generating the instructional code comprises:
traversing the hierarchical format of the tutorial file to select a tutorial attribute and corresponding value, the corresponding value including the at least one instruction;
identifying a production function of the plurality of production functions that corresponds to the at least one instruction; and
generating a code portion of the instruction code, based on the production function.

13. A system comprising:
at least one memory including instructions; and
at least one processor that is operably coupled to the at least one memory and that is arranged and configured to execute instructions that, when executed, cause the at least one processor to:
extract tutorial content from a web page providing a tutorial for a software application;
generate a tutorial file from the tutorial content, including identifying structure levels of the tutorial content, the tutorial file including ordered instructions for performing an application function of the software application and constructed in a hierarchical format in which tutorial attributes are specified with respect to corresponding values of the tutorial attributes, the values including the ordered instructions, wherein the identified structure levels are included in the hierarchical format;
classify the structure levels with respect to a collection of tutorial structure models that determine conjunctions or disjunctions between tutorial steps of the tutorial;
map the ordered instructions to corresponding application features of the software application; and
generate instruction code executable by a native instruction service of the software application and configured to enable an interactive execution of the corresponding application features within the application to implement the ordered instructions and execute the application function.

14. The system of claim 13, wherein the tutorial file is constructed in a standardized format that is applicable for storing tutorial content of a plurality of tutorial web pages in a corresponding plurality of tutorial files.

15. The system of claim 13, wherein an application feature of the application features includes a tool or action function of the software application, and wherein the interactive execution includes visually identifying the tool to a user of the software application for use in completing at least one of the ordered instructions.

16. The system of claim 13, wherein the system maps the ordered instructions including performing natural language processing (NLP) of tutorial content of the tutorial file to thereby relate an ordered instruction of the ordered instructions to a corresponding application feature from among a list of names of the application features.

17. The system of claim 13, wherein the system is configured to:
extract tutorial content from a tutorial web page;
annotate the tutorial content with tutorial attributes;
identify structure levels of the tutorial content corresponding to at least one tutorial procedure and included tutorial steps; and
generate the tutorial file with a hierarchical format reflecting the identified structure levels, and including the tutorial attributes stored with corresponding tutorial values.

* * * * *